Dec. 4, 1951  R. E. SCHULZ ET AL  2,577,277
HYDRAULIC STEADY REST
Filed Dec. 6, 1948  2 SHEETS—SHEET 2
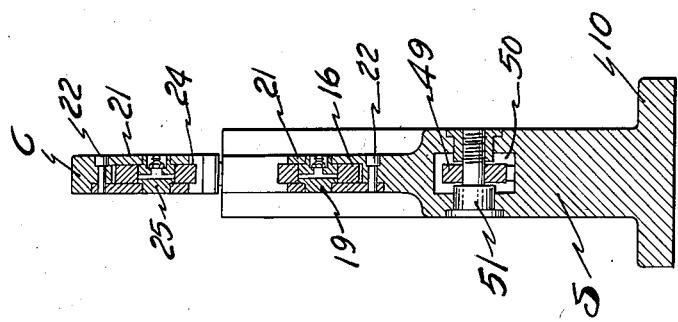
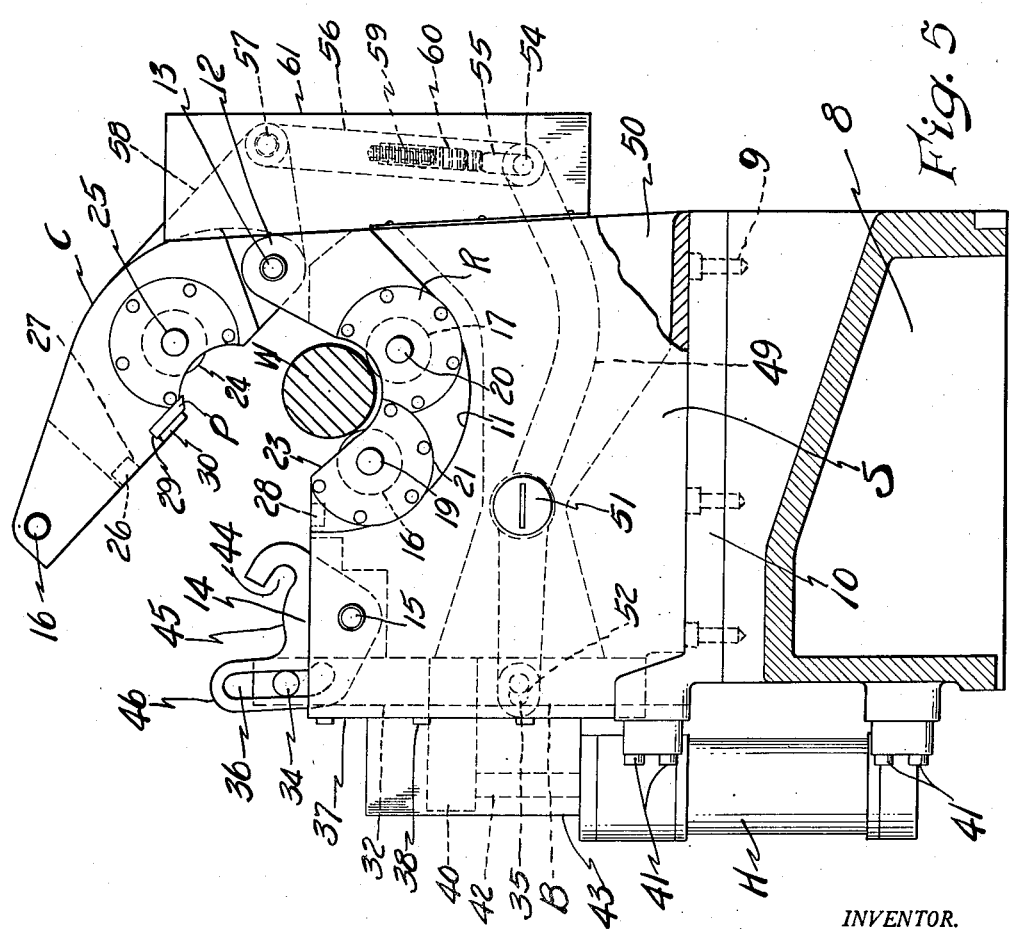
INVENTOR.
Richard E. Schulz.
Alex W. Chriscaden.
BY: Frank C. Frearman
ATTORNEY Patented Dec. 4, 1951

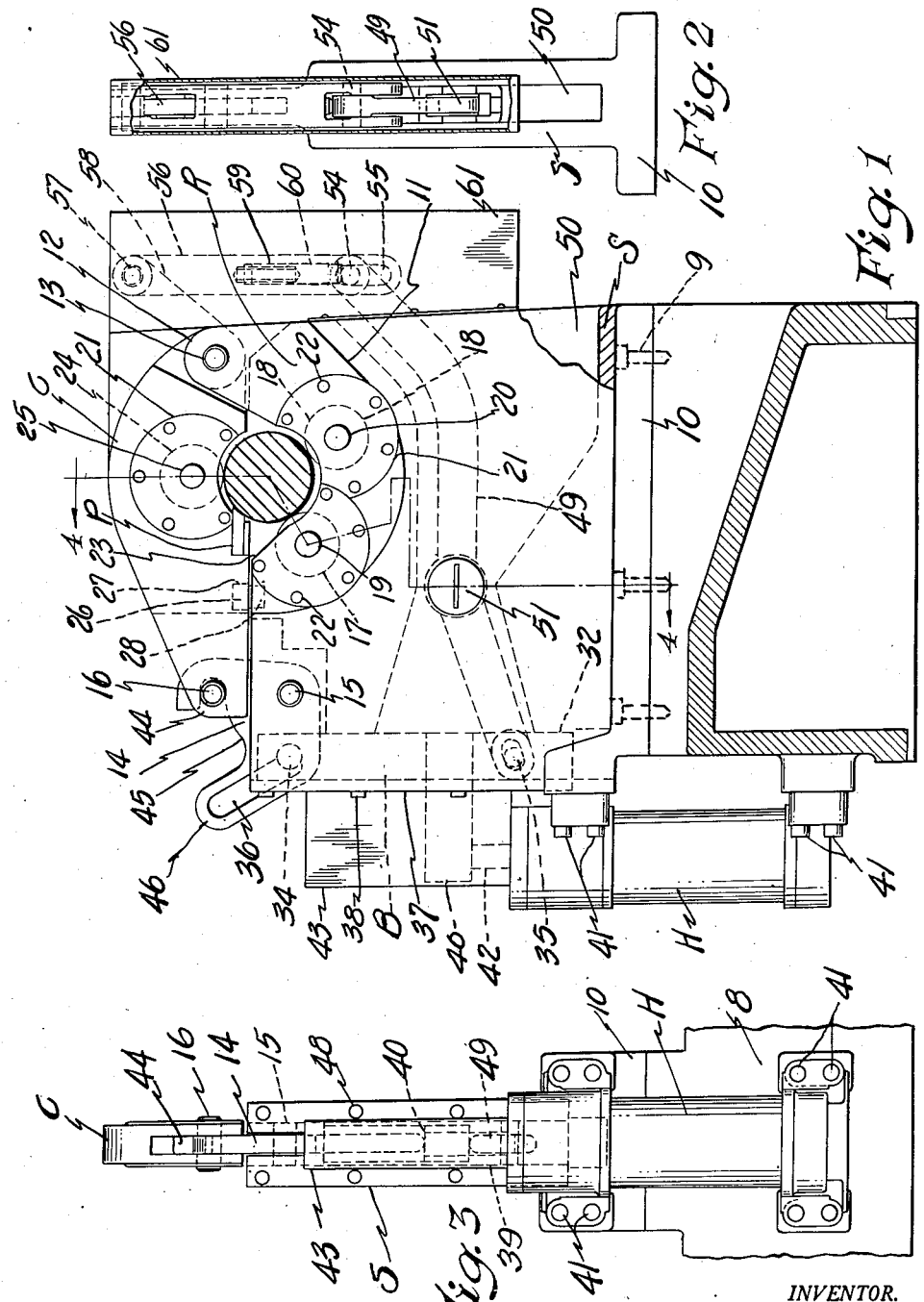

2,577,277

UNITED STATES PATENT OFFICE 2,577,277

HYDRAULIC STEADY REST

Richard E. Schulz and Alex W. Chriscaden, Saginaw, Mich., assignors to Wickes Bros., Saginaw, Mich.

Application December 6, 1948, Serial No. 63,706

3 Claims. (Cl. 82—39)

This invention relates to steady rests for use on lathes used in machining crankshafts and similar equipment.

One of the prime objects of the invention is to design a hydraulically actuated steady rest, arranged singly or in multiples for engaging a workpiece to be machined, to firmly hold it in accurate alignment on the axis of the work, and oppose the cutting force applied thereto by the cutting tools.

Another object is to provide a simple, practical and relatively inexpensive steady rest, that is very rapid in operation, and in which the entire locking and unlocking cycle is performed by remote control.

A further object is to provide a hydraulically operated steady rest of simple design, which is completely automatic in operation, and in which the steady rest is first closed and then locked in one continuous operation or cycle.

To the accomplishment of the foregoing and related ends, said invention then consists of the means hereinafter fully described and particularly pointed out in the claims, the annexed drawings and following description setting forth, in detail, certain means and one mode of carrying out the invention, such disclosed means and mode illustrating, however, but one of various ways in which the principle of the invention may be used.

In the drawings:

Fig. 1 is a side-elevational view of the steady rest showing it in locked position.

Fig. 2 is an edge-elevational view thereof.

Fig. 3 is an opposite edge-elevational view.

Fig. 4 is a sectional, elevational view taken on the line 4—4 of Fig. 1.

Fig. 5 is a view similar to Fig. 1 and showing the steady rest in unlocked position.

Referring now more particularly to the drawings in which we have shown the preferred embodiment of our invention. The numeral 8 indicates the carriage structure of a conventional lathe on which the steady rest S is mounted and secured by means of bolts 9 or the like.

The steady rest is formed as clearly shown in Fig. 1 of the drawings, the base being indicated at 10, with its upper face recessed as at 11 to accommodate a roller assembly R on which a work piece W is mounted. Spaced-apart ears 12 are also provided on the upper face of the steady rest, and a cap member C is hingedly connected thereto by means of a pin 13, said cap being swung to locked or unlocked position to accommodate the insertion and/or removal of the work piece W.

A locking member 14 is pivotally mounted on a pin 15 provided on the steady rest, and a transversely disposed pin 16 is provided in the free end of the cap for engagement by said locking member to lock the cap in position and in a manner to be presently described.

Circumferentially spaced rollers 17 and 18 are mounted on pins 19 and 20 provided in the steady rest, and cover plates 21 are provided on the ends of the rollers, and are secured in position by means of screws 22 or the like, these cover plates being cut away as at 23 to accommodate the work piece W which is cradled on said rollers.

A roller 24, similar to those on the base, is mounted on a pin 25 provided in the cap C, and cover plates 21 are provided on the ends as previously described, said roller bearing on the work piece when the cap is in locked position.

A hardened block 26 is mounted in a groove 27 provided in the inner face of the cap C, and engages a stop block 28 provided on the upper face of the steady rest, a felt pad P being mounted in a shouldered section 29 of the cap, with its outer face in contact with the work piece and serving as a wiper to eliminate chips or other foreign matter from the surface of the work piece as it is driven, this wiper being held in position by means of a plate 30 which is in turn secured by screws 31 or the like.

A vertical groove 32 is formed in the one edge of the steady rest and a lock bar B is reciprocatingly mounted therein, a pin 34 being mounted in the upper end of said lock bar, and a similar pin 35 is provided in the lower end section thereof, the pin 34 extending into a slotted opening 36 provided in the lock member 14. An end plate 37 forms a closure for the groove 32 and is held in position by means of screws 38, and a slotted opening 39 accommodates the laterally projecting portion 40 of the lock bar as it is actuated.

A hydraulic cylinder H is secured to the end wall of the carriage by means of bolts 41, and a piston (not shown) is provided therein, a piston rod 42 being connected to said piston and to the section 40 of the lock bar which is actuated by means of said piston in the usual manner, a shield or guard 43 serving to cover the moving parts.

The locking member 14 is formed as clearly shown in Fig. 1 of the drawings, jaw sections 44 being provided on the one end for engagement with the pin 16, and the upper edge of the member is upwardly curved as at 45, the outer end terminating in an angularly disposed leg section 46 slotted as at 36 to freely accommodate the pin 34, so that vertical movement of the lock bar actuates the locking member 14 to swing it into or out of locking engagement with the pin 16.

A rocking lever 49 is pivotally secured in the cored section 50 of the steady rest by means of the hinge pin 51, one end of said lever being formed with a slotted opening 52 to accommodate the pin 35, the opposite end being provided with a pin 54 engaging a slotted opening 55 provided in the vertically disposed link 56, the upper end of which is pivotally connected to a pin 57 provided in the rib 58 which is cast integral with the cap.

The link 56 is slotted to accommodate a plunger 59, the lower end of which bears against one end of the rocking lever 49, and a spring 60 is inserted in said slot to absorb lost motion in slotted openings 55, a guard 61 being secured to the steady rest to shield the moving parts.

The cap locking and unlocking mechanism is hydraulically controlled and with the mechanism in unlocked position as shown in Fig. 5 of the drawings, a workpiece W is first placed in position; pressure means is then admitted to the upper end of the cylinder H, forcing the lock bar B downwardly so that the pin 34 riding in the slot 36 swings the lock member about the hinge pin 15. Simultaneously with this movement, the rock lever 49 forces the link 56 upwardly, swinging the cap about the pivot point 13 to closed position with the block 26 in engagement with the stop block 28; continued downward travel of the lock bar B swings the jaw 14 of the locking member firmly in engagement with the pin 16, so that the work piece is firmly and accurately held, maintaining uniform and accurate contact of the rollers with the cylindrical surface of the workpiece being machined.

After the machining operation is completed, the pressure medium is admitted to the lower end of the cylinder H, reversing the direction of travel so that the lock member is rocked to unlocked position as shown in Fig. 5 of the drawings, with the cap raised to permit the quick and easy removal of the finished work and the insertion of another crankshaft.

Having thus fully set forth and described our invention, what we claim as new is:

1. A steadyrest adapted to be mounted on a carriage and comprising a base structure, circumferentially spaced, work-engaging rollers journaled thereon, a cap hingedly connected at a point directly adjacent its one end to the upper end of the base structure, a work-engaging roller journaled on said cap, a locking member pivotally mounted on the upper end of the base at a point substantially opposite the hinge point of the cap, said locking member being engageable by the free end of the cap when in locked position, a vertically disposed locking bar connected to said locking member, a link connected to the hinged end section of the cap at a point adjacent the hinge point of said cap, a rocking lever pivotally mounted on the base structure at a point intermediate its length, with its one end connected to said locking bar, and its opposite end connected to said link, and hydraulically actuated means connected to said locking bar for rocking said locking lever to swing said cap about its hinge point, and rock said locking member to engage the free end of said cap and lock it securely in position on said base structure.

2. The combination defined in claim 1 in which the locking member is formed with a jaw section and a pin carried by the free end of the hinged cap for releasable engagement with said jaw section.

3. The combination set forth in claim 1 in which an angularly disposed slot is provided in the locking member, and a pin carried by the lock bar for engagement in said slot to swing the locking member about its pivot point and into and out of locked position with the free end of the cap.

RICHARD E. SCHULZ.
ALEX W. CHRISCADEN.

REFERENCES CITED

The following references are of record in the file of this patent:

UNITED STATES PATENTS

| Number | Name | Date |
|---|---|---|
| 1,906,577 | Groene | May 2, 1933 |
| 2,114,978 | Horger | Apr. 19, 1938 |
| 2,236,057 | Groene | Mar. 25, 1941 |
| 2,256,558 | Harder | Sept. 23, 1941 |
| 2,441,150 | Jenkins | May 11, 1948 |
| 2,544,966 | Schulz | Mar. 13, 1951 |